United States Patent
Virani et al.

(10) Patent No.: US 9,250,983 B2
(45) Date of Patent: *Feb. 2, 2016

(54) SYSTEM AND METHOD FOR SHARING ITEMS BETWEEN ELECTRONIC DEVICES

(75) Inventors: Barket Virani, Thornhill (CA); Naresh Parmar, Woodbridge (CA); Theban Ganeshalingam, Mississauga (CA); Aaron Stuart, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/487,078

(22) Filed: Jun. 1, 2012

(65) Prior Publication Data

US 2013/0325949 A1 Dec. 5, 2013

(51) Int. Cl.
| | |
|---|---|
| *G06F 15/16* | (2006.01) |
| *G06F 9/54* | (2006.01) |
| *H04L 12/58* | (2006.01) |
| *H04L 29/06* | (2006.01) |

(52) U.S. Cl.
CPC .............. *G06F 9/541* (2013.01); *H04L 12/581* (2013.01); *H04L 12/582* (2013.01); *H04L 12/589* (2013.01); *H04L 12/5825* (2013.01); *H04L 51/046* (2013.01); *H04L 51/18* (2013.01); *H04L 65/1059* (2013.01); *H04L 65/4007* (2013.01)

(58) Field of Classification Search
CPC ............ H04L 65/1059; H04L 65/4007; H04L 12/581; H04L 12/582; H04L 12/5825; H04L 12/589; H04L 51/046; H04L 51/18

USPC .......................................................... 709/204
See application file for complete search history.

(56) References Cited

U.S. PATENT DOCUMENTS

| | | | |
|---|---|---|---|
| 7,774,495 B2 | 8/2010 | Pabla et al. | |
| 8,036,140 B2 * | 10/2011 | Rao et al. ...................... | 370/254 |
| 8,126,985 B1 * | 2/2012 | Kandekar et al. ............. | 709/217 |
| 2002/0118809 A1 * | 8/2002 | Eisenberg ................ | 379/202.01 |
| 2003/0009587 A1 * | 1/2003 | Harrow et al. ................ | 709/238 |
| 2003/0037181 A1 * | 2/2003 | Freed ............................ | 709/328 |
| 2003/0131061 A1 * | 7/2003 | Newton et al. ................ | 709/206 |
| 2004/0133701 A1 * | 7/2004 | Karaoguz et al. ............. | 709/246 |
| 2004/0199578 A1 * | 10/2004 | Kapczynski et al. ......... | 709/203 |

(Continued)

FOREIGN PATENT DOCUMENTS

WO     WO 02/065282 A2     8/2002

OTHER PUBLICATIONS

Archontopoulos, E.; Search Report from corresponding European Application No. 12170597.4; search completed Aug. 10, 2012.

(Continued)

*Primary Examiner* — Ario Etienne
*Assistant Examiner* — Blake Rubin
(74) *Attorney, Agent, or Firm* — Thomas Grzesik; Fleit Gibbons Gutman Bongini & Bianco P.L.

(57) ABSTRACT

A system and method are provided for operating a first electronic device for sharing items with a second electronic device. The method comprises determining that the second electronic device requires a software capability to process a first item to be shared by the first electronic device; providing information to the second device for obtaining the software capability; and sending the first item to the second device after the software capability has been acquired by the second electronic device.

18 Claims, 10 Drawing Sheets

(56) References Cited

U.S. PATENT DOCUMENTS

| | | | |
|---|---|---|---|
| 2005/0044144 A1* | 2/2005 | Malik et al. ................... 709/205 |
| 2005/0066219 A1* | 3/2005 | Hoffman et al. ................. 714/4 |
| 2005/0091202 A1* | 4/2005 | Thomas ........................... 707/3 |
| 2005/0238156 A1* | 10/2005 | Turner ..................... 379/202.01 |
| 2005/0245274 A1* | 11/2005 | Oishi et al. ................ 455/456.5 |
| 2005/0246423 A1* | 11/2005 | Starbuck et al. ............. 709/206 |
| 2006/0168026 A1* | 7/2006 | Keohane et al. ............. 709/206 |
| 2006/0242681 A1* | 10/2006 | Brain et al. .................... 725/109 |
| 2006/0253584 A1* | 11/2006 | Dixon et al. .................. 709/225 |
| 2007/0002717 A1* | 1/2007 | Nakagawa et al. ........... 369/116 |
| 2007/0101322 A1 | 5/2007 | Muschett et al. |
| 2007/0250582 A1* | 10/2007 | Sidhu et al. ................... 709/206 |
| 2008/0133650 A1* | 6/2008 | Saarimaki et al. ............ 709/203 |
| 2008/0147799 A1* | 6/2008 | Morris ........................... 709/206 |
| 2008/0201437 A1* | 8/2008 | Ludwig et al. ................ 709/206 |
| 2009/0150499 A1* | 6/2009 | Partridge et al. ............. 709/206 |
| 2009/0228938 A1 | 9/2009 | White et al. |
| 2010/0142447 A1 | 6/2010 | Schlicht et al. |
| 2010/0162229 A1 | 6/2010 | Tsuk et al. |
| 2010/0262660 A1* | 10/2010 | Little et al. .................... 709/206 |
| 2010/0299522 A1* | 11/2010 | Khambete ..................... 713/168 |
| 2011/0072107 A1* | 3/2011 | Gutta et al. .................... 709/217 |
| 2011/0082940 A1* | 4/2011 | Montemurro et al. ........ 709/227 |
| 2011/0136510 A1 | 6/2011 | Peterson et al. |
| 2011/0219423 A1* | 9/2011 | Aad et al. ........................... 726/1 |
| 2011/0276957 A1 | 11/2011 | Johnsson et al. |
| 2012/0042000 A1* | 2/2012 | Heins et al. ................... 709/201 |
| 2012/0124178 A1* | 5/2012 | Sparks .......................... 709/219 |
| 2012/0311614 A1* | 12/2012 | DeAnna et al. ............... 719/328 |
| 2012/0317485 A1* | 12/2012 | Ding et al. .................... 715/719 |

OTHER PUBLICATIONS

European Examination Report dated Jul. 23, 2015, received for European Application No. 12170597.4.

Canadian Office Action dated Aug. 7, 2015, received for Canadian Application No. 2,816,500.

\* cited by examiner

SYSTEM AND METHOD FOR SHARING ITEMS BETWEEN ELECTRONIC DEVICES

TECHNICAL FIELD

The following relates to systems and methods for sharing items between electronic devices.

DESCRIPTION OF THE RELATED ART

Electronic devices, particular mobile or handheld electronic devices such as smart phones, tablets, and laptop computers, are often used by individuals to share content items, e.g., photos, videos, documents, presentations, etc.

Sharing items between electronic devices typically requires that both devices have similar or compatible software for consuming the items, or can at least support the underlying format of the items. For example, if a first device shares a document having a portable document format (PDF) with a second device, the second device would require a PDF reader or have an application that includes such a reader. When sharing multiple items, which may have multiple format types, any inconsistencies between the capabilities of the first device and the second device can lead to latency issues and/or detract from the shared experience. When sharing items with a group of devices, these problems can be exacerbated.

BRIEF DESCRIPTION OF THE DRAWINGS

Embodiments will now be described by way of example only with reference to the appended drawings wherein.

DETAILED DESCRIPTION

Figure 1:
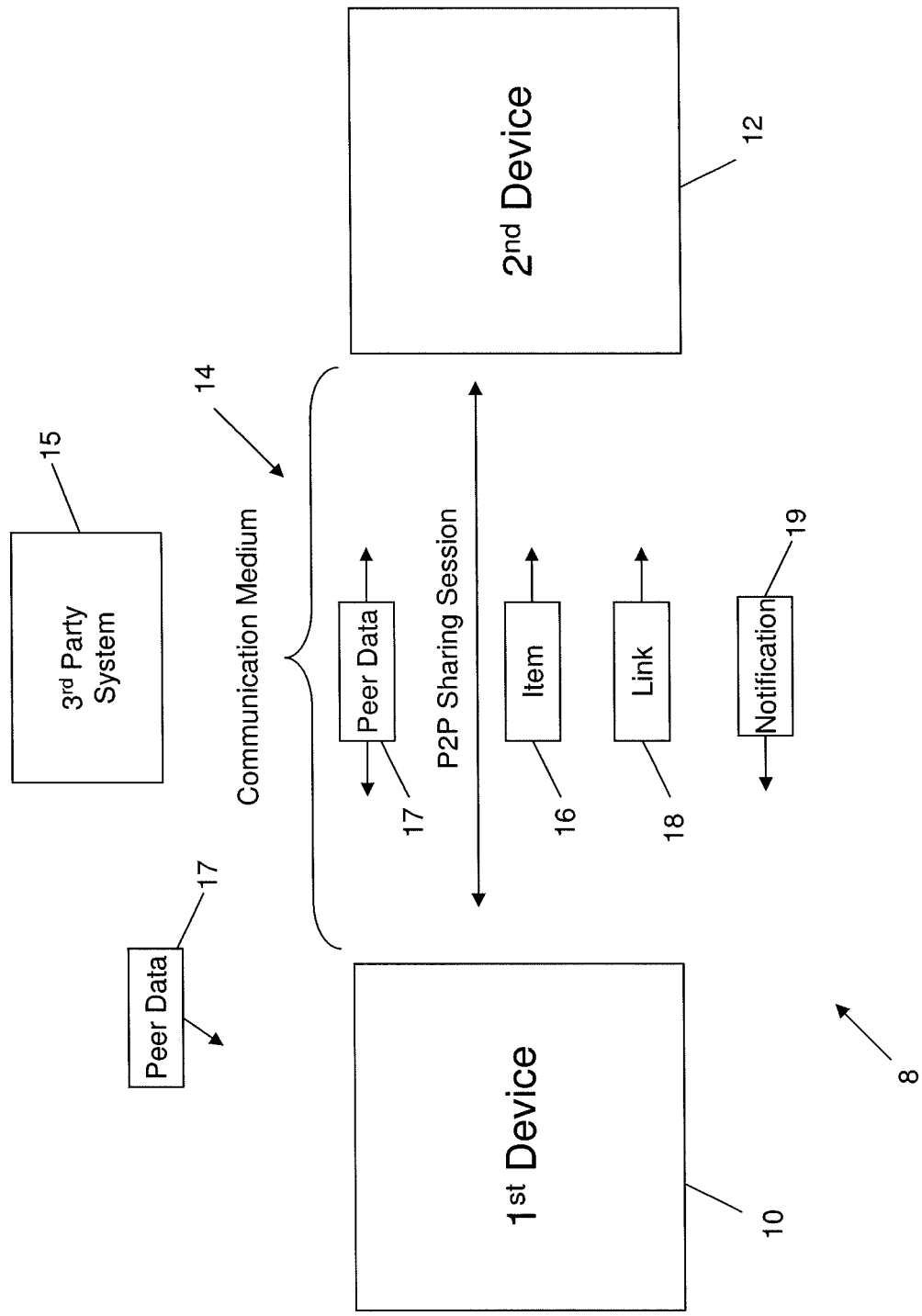
FIG. 1 is a schematic illustration of a communication system used to share items between a first device and a second device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

To facilitate peer-to-peer sharing, and to ensure that a recipient peer can support the item being shared, in accordance with one example, the sender peer can automatically coordinate the synchronization of software on the sender and recipient devices (e.g., by "bootstrapping" the recipient device), until the recipient device has the same level of software required or requested by the sender in order to participate in a session sharing the item. The sender peer may also store a transactional state of items being shared and which require software capabilities to be upgraded or new software to be obtained, such that when the requested software capabilities have been attained, the sharing session can continue. In this way, the sender peer can be notified using the transaction ID when a particular item can be shared using the same software capabilities of the sender peer, in order to resume and/or continue with the sharing session. By associating a transaction ID with each item being shared, different software supporting different items in the same session can be obtained by the recipient peer, and separate notifications sent to the sharing peer when the respective software capabilities have been achieved, which may occur in real-time or offline.

Turning to FIG. 1, an example of a communication system 8 is shown, in which a first device 10 participates in a peer-to-peer (P2P) sharing session with a second device 12 using a communication medium 14. Items 16 that are sent from the first device 10 to the second mobile device 12 during the P2P sharing session may be transmitted via the communication medium 14 according to a particular messaging or communication protocol, or other mechanism. For example, as will be explained below, a messaging infrastructure such as that provided by a P2P messaging system (e.g., see FIG. 2) can be used to facilitate the exchange of date between the first device 10 and the second device 12. A short range communication medium may also be used to pair or "tether" the first device 10 and the second device 12 (e.g., see FIG. 8) to provide a channel over which the items 16 may be sent.

In order to determine whether or not the second device 12 has the requested or required software capabilities as the first device 10 for participating in the P2P sharing session, peer data 17 may be obtained by the first device 10. As shown in FIG. 1, the peer data 17 may be obtained from a $3^{rd}$ party system 15, which may or may not be associated with the communication medium 14 used to share the items 16. For example, the $3^{rd}$ party system 15 may be a component of a P2P system 22 (see also FIG. 2), or may relate to a network infrastructure component common to both the first device 10 and the second device 12. As also shown in FIG. 1, the communication medium 14 may also be used to enable the exchange of peer data 17 between the first device 10 and the second device 12, e.g., to allow the first device 10 to determine whether or not the second device 12 has the appropriate software to process the item 16. The communication medium 14 in the example shown in FIG. 1 also enables the first device 10 to provide information to the second device 12 for upgrading or adding such appropriate software, etc.; shown in FIG. 1 as a "link" 18 and hereinafter referred to as a link 18. It can be appreciated that the link 18 may include any information that indicates where or how to obtain the software requested or required by the first device 10, e.g., an active hyperlink to a networked source, software version specifications. In some examples, the link 18 may also include a software upgrade or executable file, e.g., when the first device 10 has a network connection but the second device 10 does not have access to a network.

The capabilities of the communication medium 14 used to share items 16 can be taken advantage of where applicable to aid in determining whether or not the second device 12 has the software and/or functionality required to process a particular item 16. For example, when the first device 10 and second device 12 are contacts or "buddies" in a P2P system 22 such as that shown in FIG. 2, both devices 10, 12 may already share information about the software on the respective devices. The P2P system 10 may therefore already make information available to the first device 10 that avoids the need to exchange peer data 18 with the second device 12 in order to perform a software synchronization such as a bootstrapping procedure.

FIG. 1 also illustrates a notification 19, which may be sent by the second device 12 to the first device 10 once the requested or required software capabilities have been obtained by the second device 12. The notification 19 may include a transaction ID that enables the first device 10 to determine the transactional state of a particular item 16 and subsequently send that item 16 to the second device 12 to resume or otherwise continue with or complete a sharing session. It can be appreciated that the notification 19 may be provided by the second device 12 in a real-time sharing session wherein the software capabilities are obtained while the session is occurring, or may be provided at a subsequent time such as when the software capabilities are obtained offline. For example, the first device 10 may cache at least a portion of a set of items 16 intended to be shared until the first device 10 receives corresponding notification(s) 19 for the portion of the items 16 not able to be shared immediately. Similarly, the first device 10 may attempt to share items, e.g., by sending a communication, but the second device 12 cannot respond at that time due to network connectivity or availability. In such a scenario, the sharing session may only begin after the second device 12 receives and processes a link 18 or determines that items 16 have already been received.

Figure 2:
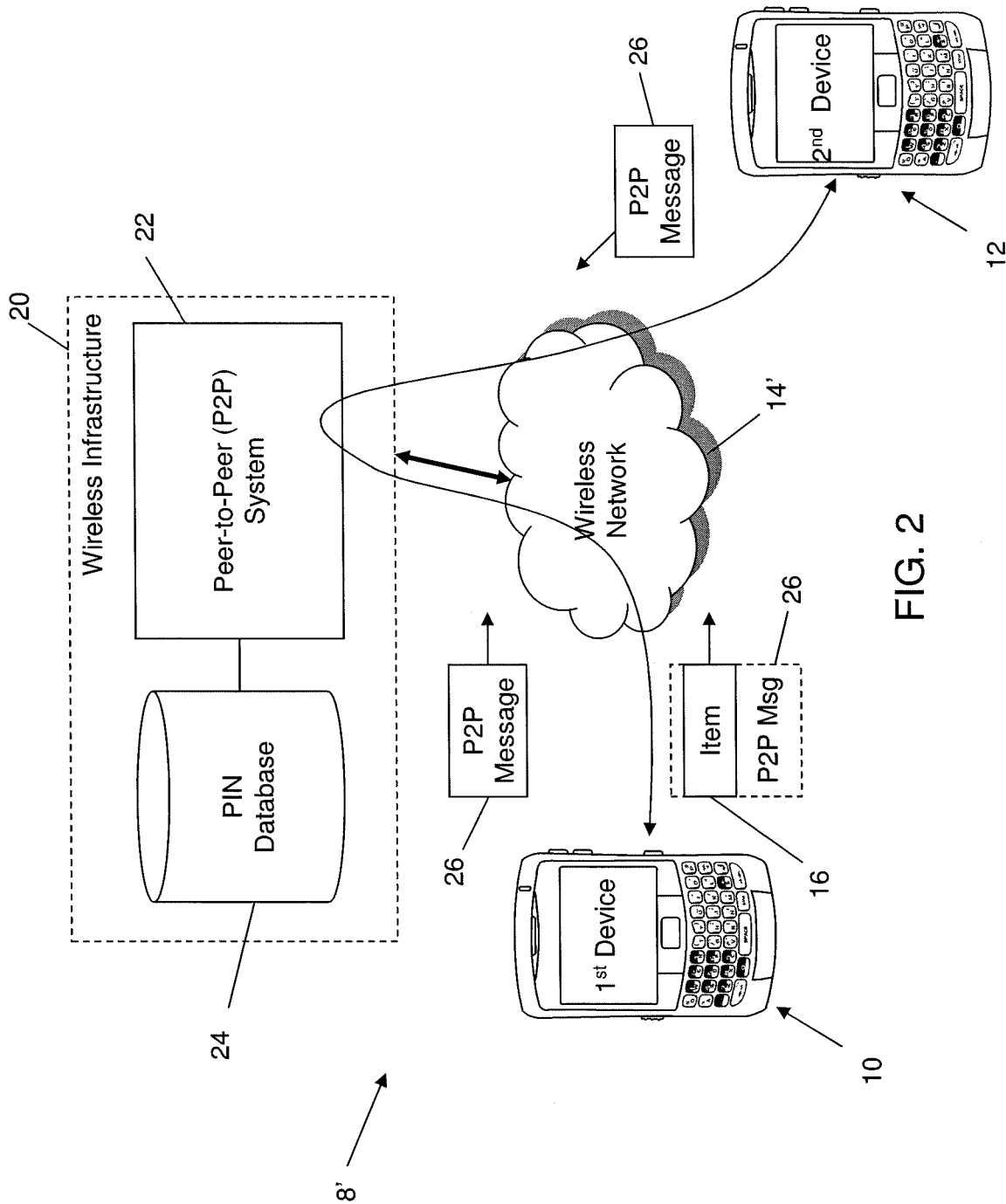
FIG. 2 is a schematic illustration of a peer-to-peer (P2P) communication system used for sharing items between a first device and a second device.

An example of a P2P-based communication system 8' including a wireless infrastructure 20, is shown in FIG. 2. The communication system 8' at least in part, enables the first and second devices 10, 12 to communicate via a P2P system 22 over a wireless network 14'. In the example shown in FIG. 2, the first and second devices 10, 12 are illustrated as being mobile devices such as smart phones. However, it can be appreciated that other types of electronic devices configured to conduct P2P messaging may also be capable of communicating with or within the communication system 8'. It will also be appreciated that although the examples shown herein are directed to mobile communication devices, the same principles may apply to other devices capable of communicating with the P2P system 22. For example, an application (not shown) hosted by a desktop computer or other "non-portable" or "non-mobile" device may also be capable of communicating with other devices (e.g., including first and second devices 10, 12) using the P2P system 22.

The P2P system 22 is, in this example, a component of the wireless infrastructure 20 associated with the wireless network 14'. The wireless infrastructure 20 in this example includes, in addition to the P2P system 22, and among other things not shown for simplicity, a person identification number (PIN) database 24. The PIN database 24 in this example is used to store one or more PINs associated with particular devices, whether they are subscribers to a service provided by the wireless infrastructure 20 or otherwise. To illustrate operation of the P2P system 22 with respect to FIGS. 2 to 4, the first and second devices 10, 12 will be commonly referred to as "mobile devices 10".

One of the mobile devices 10 may communicate with the other of the mobile devices 10 and vice versa via the P2P system 22, in order to perform P2P messaging or to otherwise exchange P2P-based communications. For ease of explanation, in the following examples, any P2P-based communication may also be referred to as a P2P message 26 as shown in FIG. 2.

Figures 3, 4:
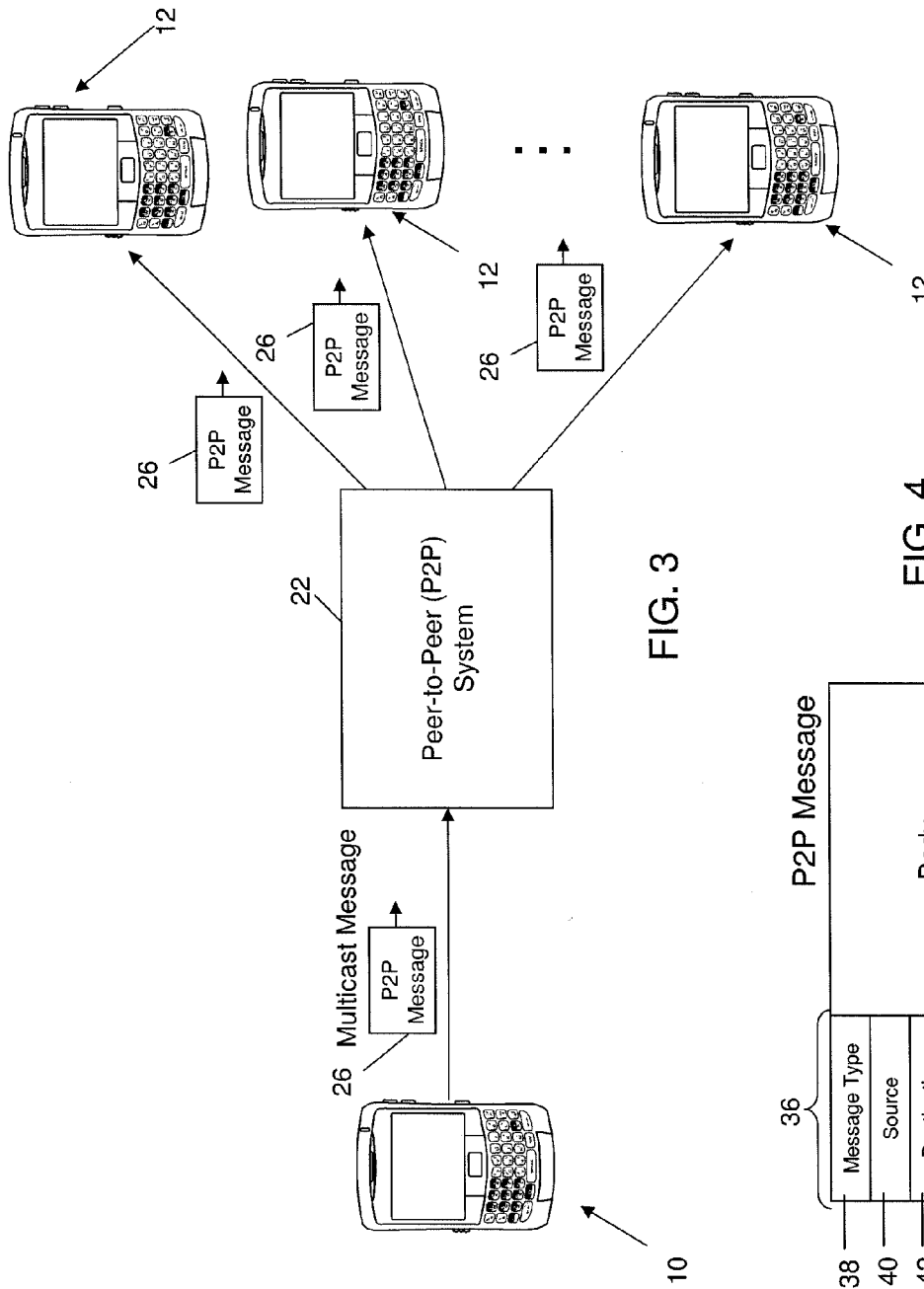
FIG. 3 is a schematic illustration of the P2P communication system of FIG. 2 being used to send multi-cast messages.
FIG. 4 is a schematic illustration of a P2P message format.

In some examples, the P2P system 22 may be capable of sending multi-cast messages, i.e. forwarding a single message from a sender to multiple recipients without requiring multiple P2P messages 26 to be generated by such sender. For example, as shown in FIG. 3, the P2P system 22 can be operable to enable a single P2P message 26 to be sent to multiple recipients by addressing the P2P message 26 to multiple corresponding P2P addresses, and having the P2P system 22 multicast the message 26 to those recipients. It can be appreciated that such capabilities enable the first device 10 shown in FIG. 1 to share the item 16 with multiple second devices 12.

An example P2P message 26 is shown in greater detail in FIG. 4, and has a format that is particularly suitable for a PIN-to-PIN based system. In a typical P2P protocol, each P2P message 26 has associated therewith a source corresponding to the mobile device 10 which has sent the P2P message 26 and includes a destination identifying the one or more intended recipients. Each P2P message 26 in this example includes a body 34, which contains the content for the P2P message 26 (e.g., text or other data), and a header 36, which contains various fields used for transmitting and processing each P2P message 26. In this example, the header 36 includes a message type field 38 to specify the type of transmission (e.g., chat, registration, block, presence, sharing session etc.), a source field 40 to specify the device address for the sender, a destination field 42 to specify the device address(es) for the one or more intended recipients, an ID field 44 to identify the corresponding P2P application (e.g., see sharing application 64 in FIG. 6) and a timestamp field 46 to indicate the time (and if desired, the date) at which the P2P message 26 was sent by the designated sender.

It can be appreciated that in this example, the ID field 44 can be used to specify the application ID to identify a P2P application on the mobile device 10. Where the P2P application relates to, for example, an IM system, the message type field 38 can also be used to designate an IM communication, and the ID field 44 may then correspond to a conversation ID, i.e. a conversation thread the message 32 corresponds to (e.g., such that each message 32 is identified by the conversation in which it was sent). The message type field 38 and the ID field 44 can therefore also be used to identify a sharing session, as will be explained in greater detail below.

It will be appreciated that other information or attributes may be included in the P2P message 26, such as a subject field (not shown) to enable a subject for part or all of a conversation (in an IM embodiment) to be transported with the P2P message 26 (e.g., to create new subjects, modify subjects, notify others of subjects, etc.), or application details field (not shown) to provide application-specific information such as the version and capabilities of the application.

The P2P system 22 can utilize any suitable P2P protocol operated by, for example, a P2P router (not shown), which may be part of the wireless infrastructure 20. It can be appreciated, however, that a stand-alone P2P configuration (i.e. one that does not rely on the wireless infrastructure 20—not shown) may equally apply the principles herein. The P2P system 22 may also enable mobile devices 10 to communicate with desktop computers thus facilitating, for example, communications such as instant messaging (IM) between mobile applications and desktop applications on the desktop computer.

The P2P system 22 can be implemented using a router-based communication infrastructure, such as one that provides email, short message service (SMS), voice, Internet and other communications. A wireless router or server used in systems such as those that provide push-based communication services is suitable for hosting a P2P messaging router. In FIG. 2, the wireless infrastructure 20 facilitates P2P communications such as instant messaging between mobile devices 10. P2P messaging, such as IMing, is provided by an associated application stored on each mobile device 10, e.g., an IM application, which can be initiated, for example, by highlighting and selecting an icon from a display as is well known in the art. The P2P system 22 routes messages between the mobile devices 10 according to the P2P protocol being used. For example, the P2P protocol may define a particular way in which to conduct IM or other types of messaging.

In general, in a P2P protocol, the sender of the P2P message 26 knows the source address of the intended recipient, e.g., a personal identification number (PIN). Knowledge of the source address may be established when the two devices request to add each other to their respective contact or buddy lists. A particular mobile device 10 can communicate directly with various other mobile devices 10 through the P2P system 22 without requiring a dedicated server for facilitating communications. In other words, the P2P system 22 enables the mobile devices 10 to communicate with each other directly over the wireless infrastructure 20 in accordance with the P2P protocol.

When conducting a P2P session according to the example shown in FIG. 2, the mobile devices 10 can communicate directly with the wireless infrastructure 20 in a client based exchange where, as noted above, an intermediate server is not required. A P2P message 26 sent by one mobile device 10 is received by the wireless infrastructure 20, which obtains the source address for the intended recipient (or recipients) from information associated with the message 26 (e.g., a data log) or from the P2P message 26 itself. Upon obtaining the recipient's address according to the P2P protocol, the wireless infrastructure 20 then routes the message 26 to the recipient associated with the mobile device 10 having such address (or recipients having respective addresses). The wireless infrastructure 20 typically also provides a delivery confirmation to the original sender, which may or may not be displayed to the user. The destination device can also provide such delivery information. The wireless infrastructure 20 may be capable of routing P2P messages 26 reliably as well as being capable of holding onto the P2P messages 26 until they are successfully delivered. Alternatively, if delivery cannot be made after a certain timeout period, the wireless infrastructure 20 may provide a response indicating a failed delivery. The wireless infrastructure 20 may choose to expire or delete a message 26 if a certain waiting period lapses.

Figure 5:
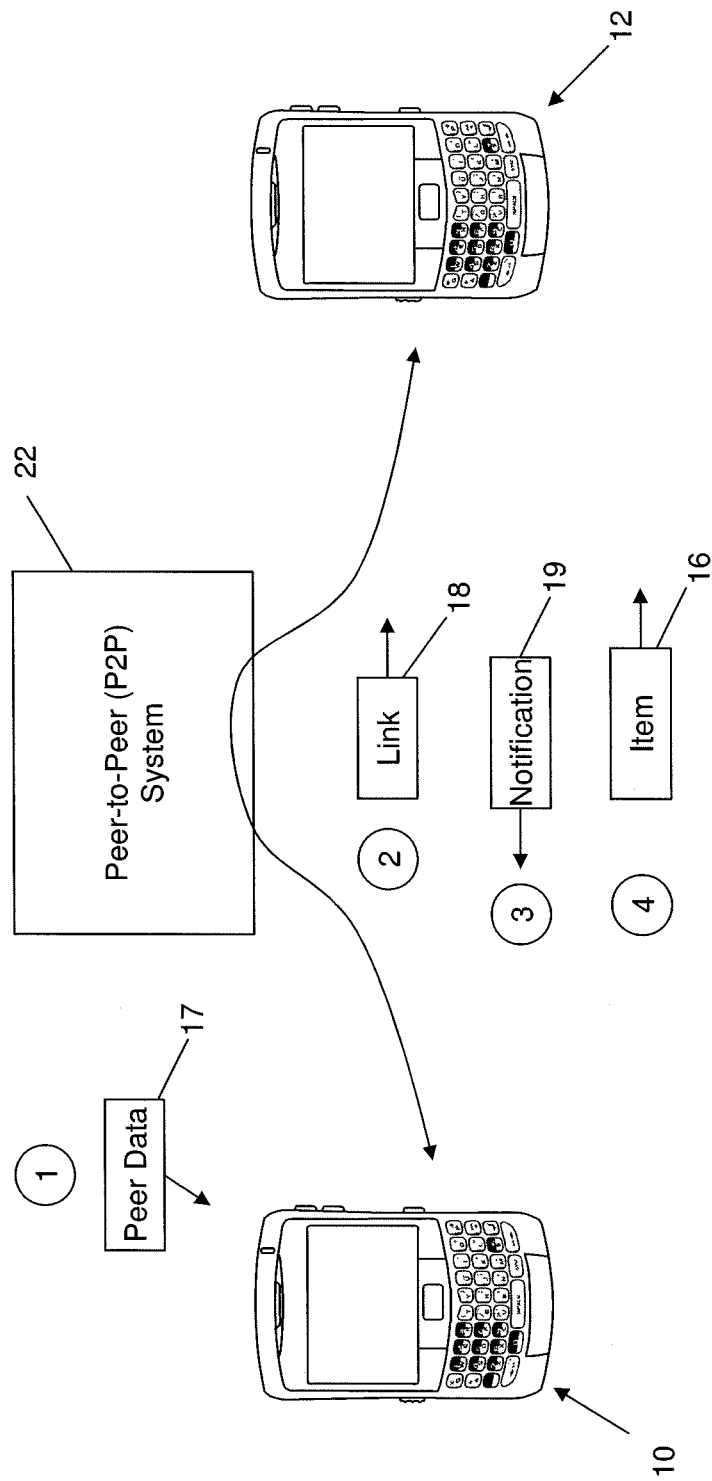
FIG. 5 is a schematic illustration of a sharing session between first and second mobile devices using a P2P system.

FIG. 5 illustrates an example of a sharing session between a first device 10 and a second device 12 using a P2P system 22. In the example shown in FIG. 5, it may be assumed that the first device 10 has one item 16 to be shared but that the second device 12 does not have the software capabilities desired by the first device 10 or otherwise required to carry out the sharing session. For example, the item 16 may include a video of a particular format which requires a particular type of media player that the second device 12 does not currently have. At stage 1, the first device 10 obtains peer data 17 from the P2P system 22. Since the first and second devices 10, 12 are associated with the same P2P system 22, that P2P system 22 may have access to information about the respective devices 10, 12, such as what software applications and versions thereof are currently running on each device. The P2P system 22 can therefore, in such scenarios, provide the peer data 17 required by the first device 10 without requiring the first device 10 to communicate with the second device 12. In the example shown in FIG. 5, the peer data 17 indicates that the second device 12 does not have the software capabilities necessary for sharing a particular item 16 as dictated by the first device 10.

At stage 2 shown in FIG. 5, the first device 10 sends a link 18 to the second device 12 which, when processed by the second device 12, causes the second device 12 to obtain the requested software capabilities. The link 18 may trigger a prompt or other user interaction, or may trigger an automatic download operation. The link 18 is associated with a particular transaction ID such that this transaction ID can be used by the second device 12 to indicate when the software capabilities have been obtained. The first device 10 may also use the transaction ID to store a transactional state for the sharing session in order to be able to resume the sharing session once notified by the second device 12. Once the software capabilities have been obtained by the second device 12, the second device 12 sends a notification 19 to the first device 10 at stage 3, and the item 16 can be sent by the first device 10 to the second device 12 at stage 4.

Figure 6:
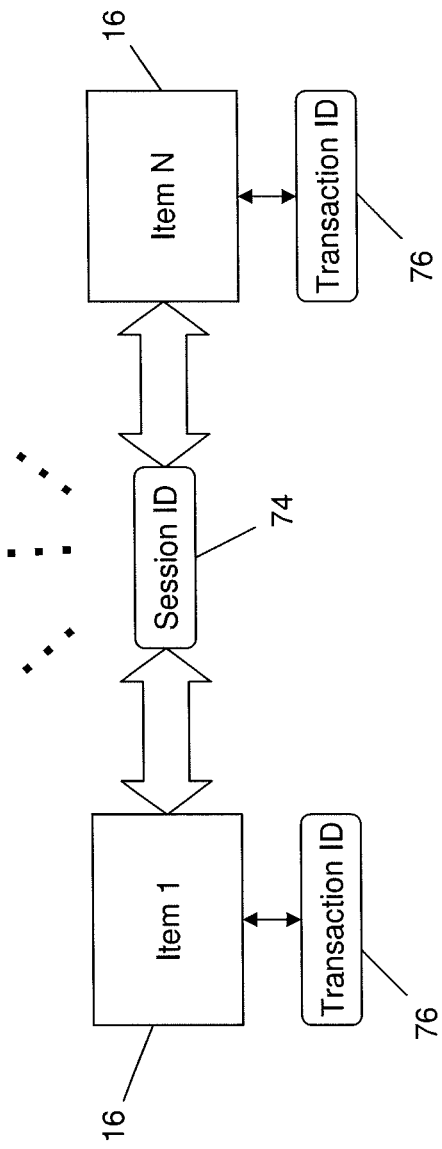
FIG. 6 is a schematic illustration of multiple items related by a common session identifier (ID)

FIG. 6 schematically illustrates that multiple items 16 may be related to each other by way of a session ID 74. The session ID 74 may be used to organize a number of items 16 that are to be shared by the first device 10 with the second device 12. For example, a set of documents in a presentation or shared meeting space may be linked to each other by way of a session ID 74. Each item 16 is also given a transaction ID 76 that is unique within the session ID 74. The transaction ID 76 can be used to order the items 16 being shared, or otherwise identify a specific item 16. For example, if a series of photos is being shared and one has a different format than the others, and that different format is not supported by the second device 12, the first device 10 can store the transaction ID 76 for that item 16 to either resume a halted presentation while the software capabilities associated with that format are obtained, or to enable the first device 10 to subsequently send that item 16 once the software capabilities are obtained offline. A session may therefore include multiple items 16 and multiple item types. If more than one item 16 is associated with a common software capability that is lacking on the second device 12, a single link 18 identifying multiple transaction IDs 76 and a single software capability may thus be used. However, it can be appreciated that a link 18 may also specify multiple software capabilities required by the second device 10, with multiple transaction IDs 76 for the respective items 16. As such, multiple notifications 19 would be generated, one for each software capability that is obtained. Each notification 19 may trigger the subsequent delivery of a single item 16 or multiple items 16 of the same type. By storing the transactional state of a sharing session when the second device 12 is required to obtain additional software capabilities, the first device 10 can continue with, resume or otherwise complete a sharing session accordingly. It can be appreciated that various mechanisms may be used when a sharing session is to resume, including P2P messages 26 or other communication media, and may include automatic triggers, user prompts, etc.

Figure 7:
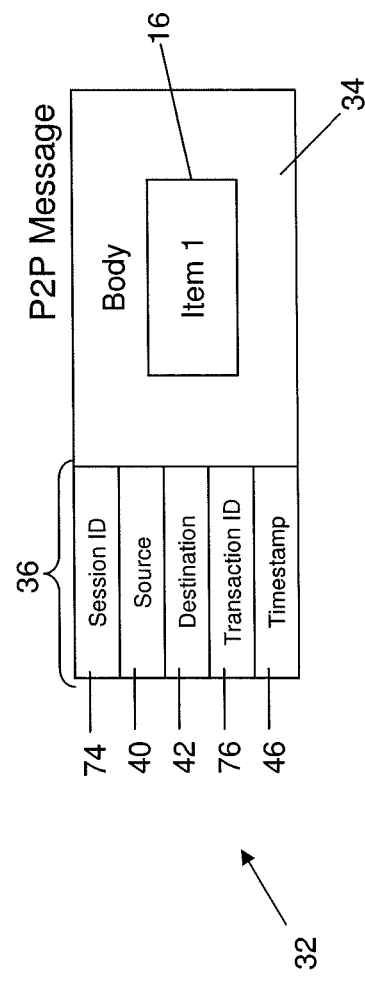
FIG. 7 is a schematic illustration of a P2P message configured to carry an item being shared.

As discussed above, the session ID 74 and transaction ID 76 can be included in the data structure carrying the item 16 over the communication medium 14, e.g., a P2P message 26 as shown in FIG. 7. In the example shown in FIG. 7, the session ID 74 may be included as a message type and the transaction ID 76 included as a message ID. The body 34 of the P2P message 26 may also be used to include the item 16. It can be appreciated that other types of messages (not shown) may be similarly adapted to enable an item 16 to be sent over other communication media. Also, the P2P message 26 shown in FIG. 7 may similarly carry other types of messages associated with the sharing session, such as peer data 17, links 18, notifications 19, etc.

Figure 8:
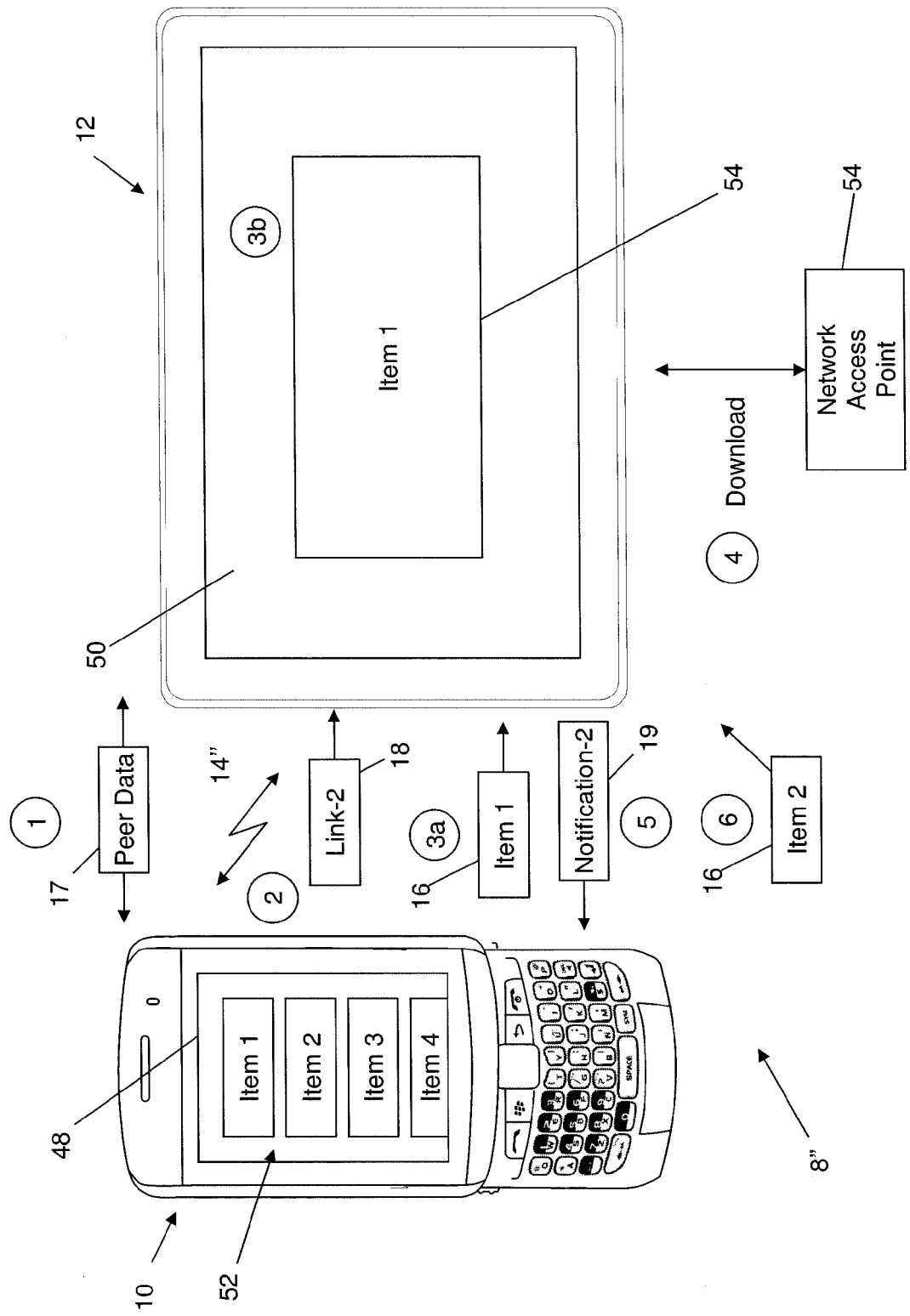
FIG. 8 is a schematic illustration of a short-range pairing between the first and second electronic devices for sharing items.

The items 16 being shared by the first device 10 may be shared with other devices relatively close in proximity, or may be shared with another device utilized by the same individual. For example, as shown in FIG. 8, the first device 10 sharing items 16 may be a smart phone while the second device 12 receiving the items 16 may be a tablet computer controlled by the same user. The examples described herein may therefore be applied to screen sharing or other tethered or paired environments, e.g., where the tablet is used to view items residing on the smart phone. Despite being operated by the same user, the second device 12 may not have the appropriate software to process an item 16 shared by the first device 10. For example, an application which has versions created for use on both the smart phone and the tablet may require periodic upgrades but only the smart phone may have been upgraded at a particular time due to network connectivity. In such a situation, despite running compatible applications, the smart phone and tablet may be "out-of-sync" due to one device not yet being upgraded. Additionally, an application that could be used on the tablet, but which has not yet been downloaded, could be identified as missing from the tablet in order to share particular items 16. By enabling the first device 10 to automatically determine the software capabilities of the second device 12 and update or upgrade the second device 12 through, e.g., bootstrapping the second device 12, pairs of related devices can be synchronized without requiring the user to actively ensure that both devices have the same applications, upgrades, etc.

It can be appreciated that the items 16 may also be shared amongst multiple individuals in close proximity and thus the single-user-multiple-device example is for illustrative purposes only.

Turning now to the example shown in FIG. 8, the first device 10 is displaying a set of viewable items 52 on a screen 48. In this example, it may be assumed that of the viewable items 52, at least Item 2 cannot be viewed on the second device 12, e.g., due to a missing application or upgrade. At stage 1, the first device 10 requests, exchanges, or otherwise obtains peer data 17 for the second device 12, which includes the software capabilities of the second device 12. From the peer data 17, the first device 10 determines that Item 2 is not supported by the second device 12 and thus a link 18 for item 2 (shown as Link-2 in FIG. 8) is sent to the second device 12, at stage 2. FIG. 8 also illustrates an example wherein the sharing session is performed, and software updates/upgrades/downloads performed in a real-time session. In such examples, some of the viewable items 52 may be immediately consumable by the second device 12 and thus, as shown in FIG. 8, Item 1 may be sent to the second device 12, at stage 3$a$, and viewed on a display screen 50 of the second device 12, at stage 3$b$, while the second device 12 downloads the necessary software capability, at stage 4, using a connection to an available network access point 54. For example, the second device 12 may use information in the link 18 to download the appropriate software, e.g., by accessing a network through a WiFi connection. Once the download has completed, the second device 12 sends a notification 19 identifying the transaction ID 76 for Item 2 (shown as Notification-2 in FIG. 8), at stage 5, and Item 2 is then sent by the first device 10 to the second device 12, at stage 6.

Figure 9:
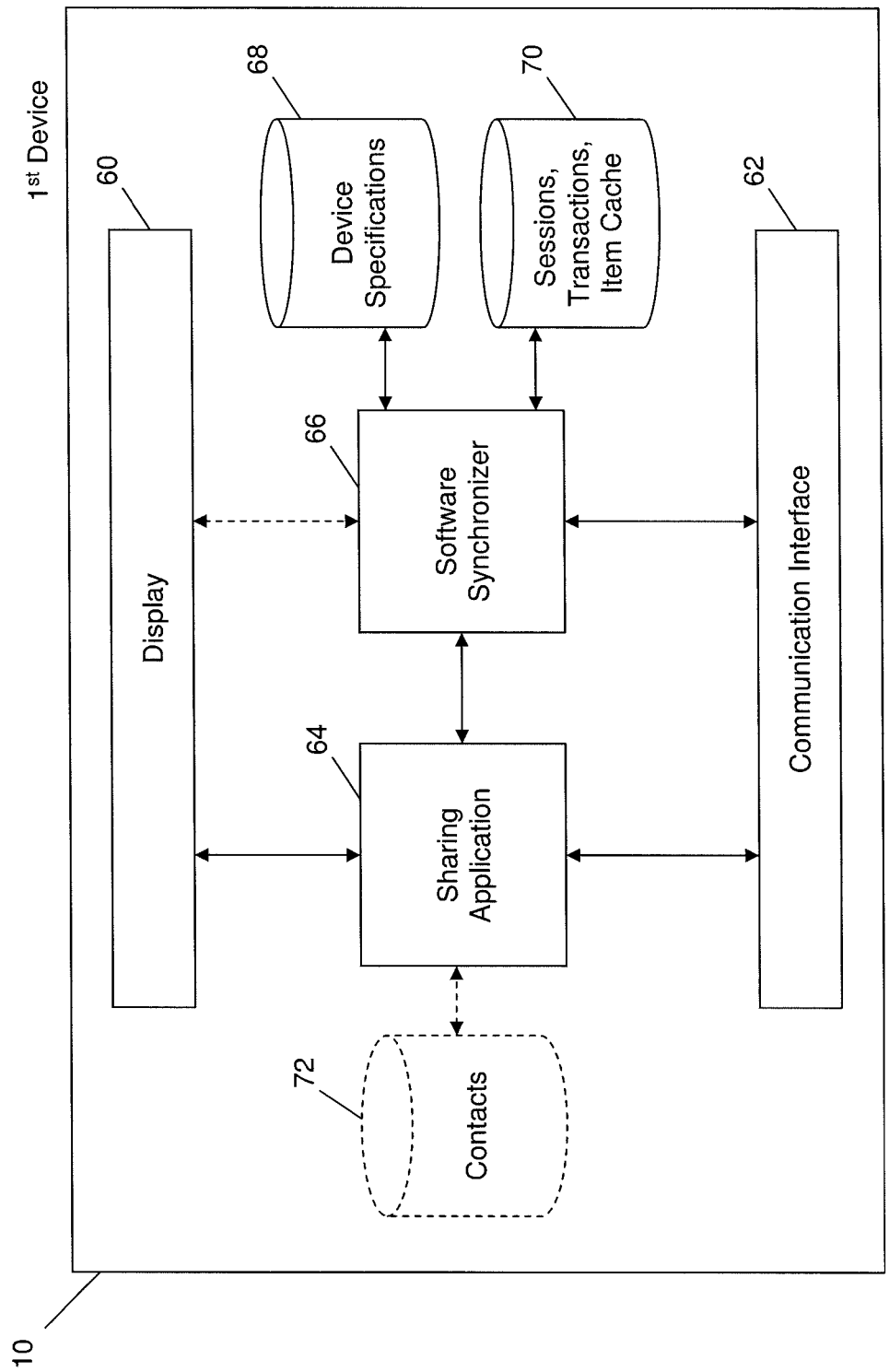
FIG. 9 is a block diagram of an example of a configuration for an electronic device operable to share items with other electronic devices.

FIG. 9 illustrates an example of a configuration for the first device 10. It can be appreciated that the second device 12 may also be configured in the same way. The first device 10 includes a display 60 for rendering user interface elements on the screen 48, and a communication interface 62 for interacting with, e.g., the wireless network 14, the second device 12 directly (e.g., via Bluetooth, infrared, near field communication (NFC) interface, etc.). The first device 10 in this example also includes a sharing application 64 such as a media player, an IM application, etc., which enables items 16 to be transferred to one or more second devices 12 and may be capable of displaying viewable items 52 on the screen 48. The sharing application 64 may include a memory element such as a database, table, or list of contacts 72, which provides details concerning devices associated with such contacts. For example, an IM application may include details of what applications are running on the device for a particular contact, which may be used by or provided to a software synchronizer 66 to determine if a synchronization such as bootstrapping is required to enable the second device 12 to view an item 16.

The software synchronizer 66 includes a memory element such as a database, table, or list of device specifications 68 that may be used to store, update, and cache specifications related to particular second devices 12 that can be relied upon to determine if an item 16 can be sent or if software capabilities may be required by the second device 12. It can be appreciated that the device specifications 68 may be available from the contacts 72, by exchanging peer data 17 with the second device 12, or from any available source such as a $3^{rd}$ party system 15. The device specifications 68 may therefore not be stored on the first device 10 but instead accessed directly from a particular source and the configured shown in FIG. 9 is therefore illustrative only. The software synchronizer 66 may also include or otherwise have access to a memory element such as a database, table, or list of sessions, transactions, and item cache 70 to track current sharing sessions, store transactional states, and cache items for which software capabilities are required, thus enabling sharing to resume after a bootstrapping or other synchronization operation is executed.

Figure 10:
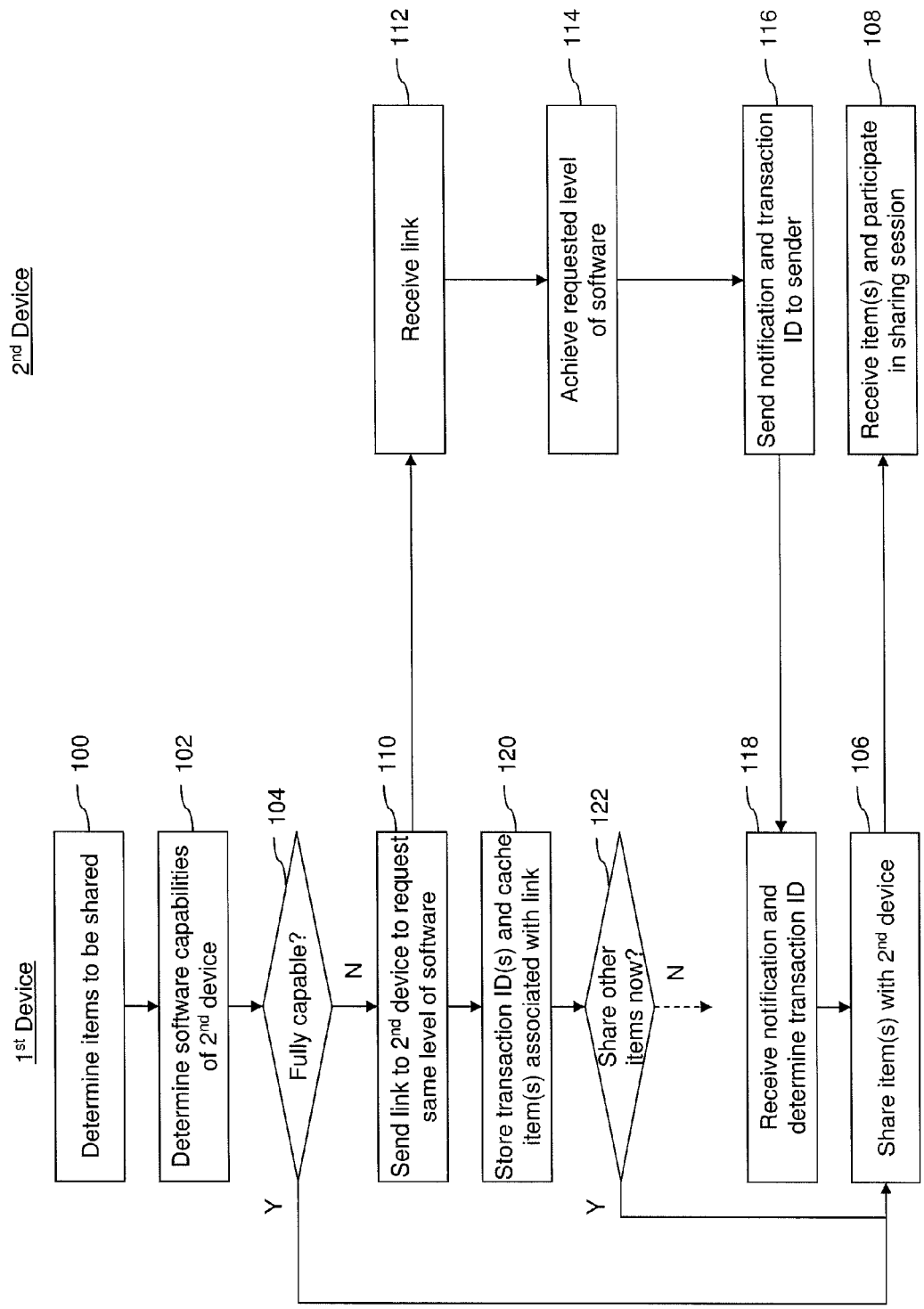
FIG. 10 is a flow chart illustrating example operations that may be performed in sharing items between a first device and a second device.
Figure 11:
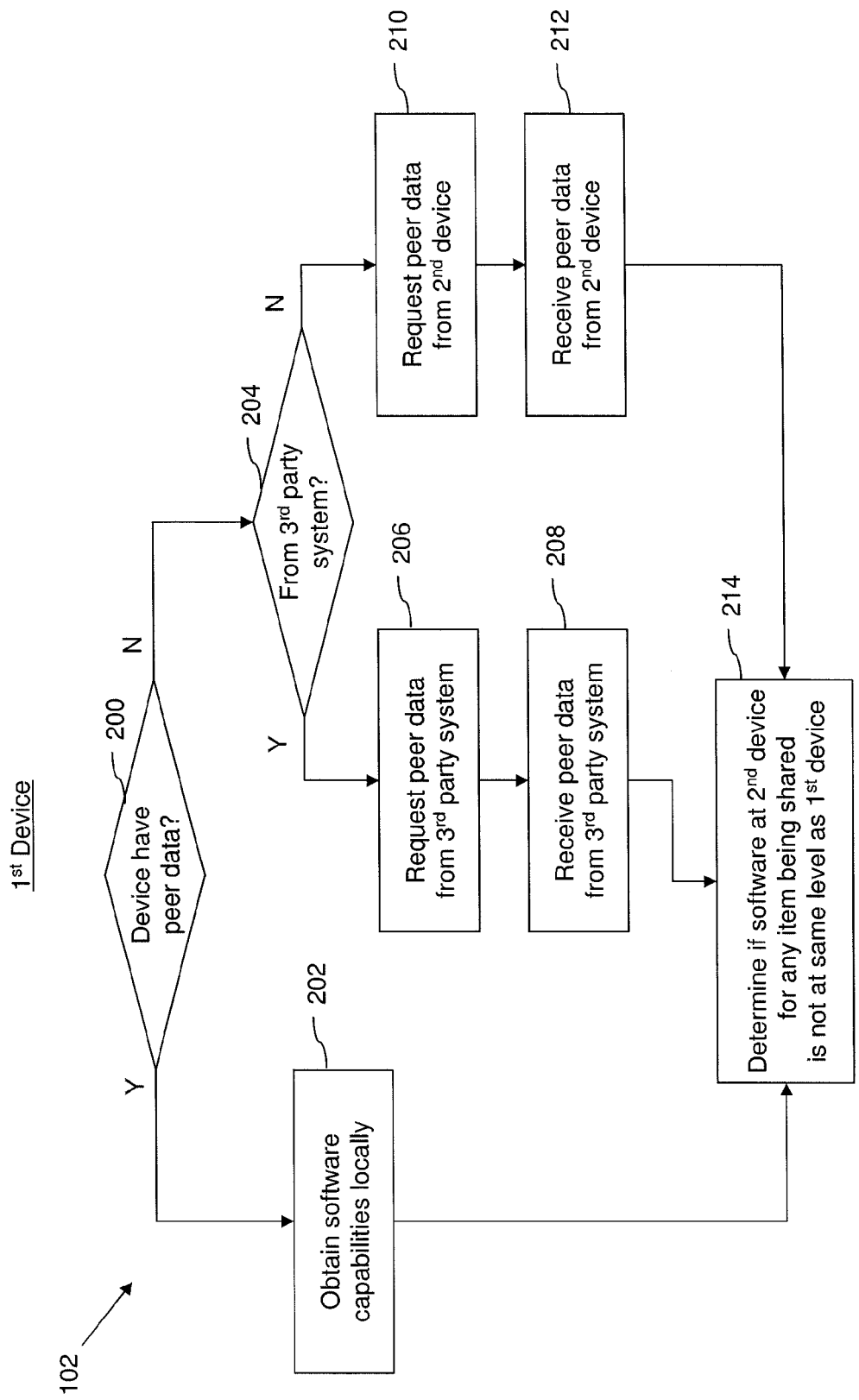
FIG. 11 is a flow chart illustrating example operations that may be performed in determining software capabilities of a recipient device.

FIG. 10 illustrates operations that may be performed by the first and second devices 10, 12 in having the second device 12 obtain one or more software capabilities for sharing items 16. At 100, the first device 10 determines a set of one or more items 16 to be shared with the second device 12, e.g., a set of photos, a presentation having multiple items 16, etc. The first device 10 determines the software capabilities of the second device 12, at 102, in order to determine, at 104, if the second device 12 is fully capable of sharing the items determined at 100. As discussed above, the software capabilities of the second device 12 may be determined in various ways and examples are shown in FIG. 11, described below.

If the second device 12 has all of the software capabilities required to share the items 16 determined at 100, the items may be shared with the second device 12, at 106, and received by the second device 12, allowing the second device 12 to participate in the sharing session, at 108. If at least one of the items 16 to be shared cannot be supported by the current software capabilities of the second device 12, a link 18 is sent to the second device 12, at 110, to request that the second device 12 have the same level of software capabilities as the first device 10, at least with respect to sharing the at least one of the items 16. As discussed above, the link 18 may include or be associated with multiple transaction IDs 76, when there are multiple items 16 of the same type and/or multiple types of items 16 requiring additional software capabilities of the second device 12. As such, the link 18 may direct the second device 12 to obtain multiple different software capabilities related to multiple item types.

The second device 12 receives the link 18, at 112, and downloads or otherwise obtains one or more software capabilities in order to achieve the same level of software as the first device 10, in accordance with what is requested in the link 18, at 114. Once the requested level of software has been achieved, at 114, the second device 12 sends one or more notifications 19 to the first device 10, at 116, which identifies the transaction IDs 76 for the items 16 associated with the software synchronization. The first device 10 receives the notification 19, at 118, and determines, from the transaction IDs 76 indicated in the notification 19, any additional items 16 that can now be shared, at 106.

The transaction IDs 76 included in the notification 19 can be compared to transaction IDs 76 stored by the first device, at 120, after the link 17 was sent at 110, in order to maintain the transactional state of the sharing session. Alternatively, the transaction IDs may be store prior to or simultaneously with sending the link 17 to the $2^{nd}$ device, at 110. As shown in FIG. 10, it can be appreciated that although at least one item 16 requires software capabilities to be obtained by the second device 12, other items 16 may be capable of being shared immediately. If the first device 10 determines, at 122, that other items 16 can be shared immediately, those items 16 can be shared, at 106. This immediate sharing of at least some items can reduce the number of items 16 required to be cached by the first device 10 as these items can be sent to the second device 12 immediately. Also, sharing at least some items 16 immediately may enable a real-time session to at least partially progress until notifications 19 are received with respect to the cached items 16.

FIG. 11 illustrates example operations that may be performed in determining software capabilities of the second device 12. At 200, the first device 10 determines if the peer data 17 can be found locally, i.e. on or directly accessible to the first device 10. If so, the software capabilities of the second device 12 are determined locally, at 202. If the software capabilities of the second device 12 are not locally available, the first device 10 determines, at 204, if the software capabilities can be determined from a third party system, e.g., the P2P system 22. If the software capabilities can be determined from a third party system, the first device 10 requests such peer data 17 from the third party system, at 206, and receives the peer data 17 from the third party system, at 208. If the software capabilities cannot be obtained from a third party system, the first device 10 may proceed to obtain the software capabilities directly from the second device 12 by requesting the peer data 17 from the second device 12, at 210, and receiving the peer data 17, at 212, from the second device 12. At 214, the first device determines, from the software capabilities determined locally, or using peer data 17, if the software on the second device 12 for any of the items 16 being shared is not at the same level as the first device 10. From this determination, the first device 10 can determine if the second device 12 is "fully capable," at 104 (see FIG. 10).

Accordingly, there is provided a method of operating a first electronic device for sharing items with a second electronic device, the method comprising: determining that the second electronic device requires a software capability to process a first item to be shared by the first electronic device; providing information to the second device for obtaining the software capability; and sending the first item to the second device after the software capability has been acquired by the second electronic device.

In another aspect, there is provided a computer readable storage medium comprising computer executable instructions for operating a first electronic device for sharing items with a second electronic device, the computer executable instructions comprising instructions for: determining that the second electronic device requires a software capability to process a first item to be shared by the first electronic device; providing information to the second device for obtaining the software capability; and sending the first item to the second device after the software capability has been acquired by the second electronic device.

In yet another aspect, there is provided an electronic device comprising a processor, and memory, the memory comprising computer executable instructions for operating the processor to: determine that the second electronic device requires a software capability to process a first item to be shared by the first electronic device; provide information to the second device for obtaining the software capability; and send the first item to the second device after the software capability has been acquired by the second electronic device.

Figure 12:
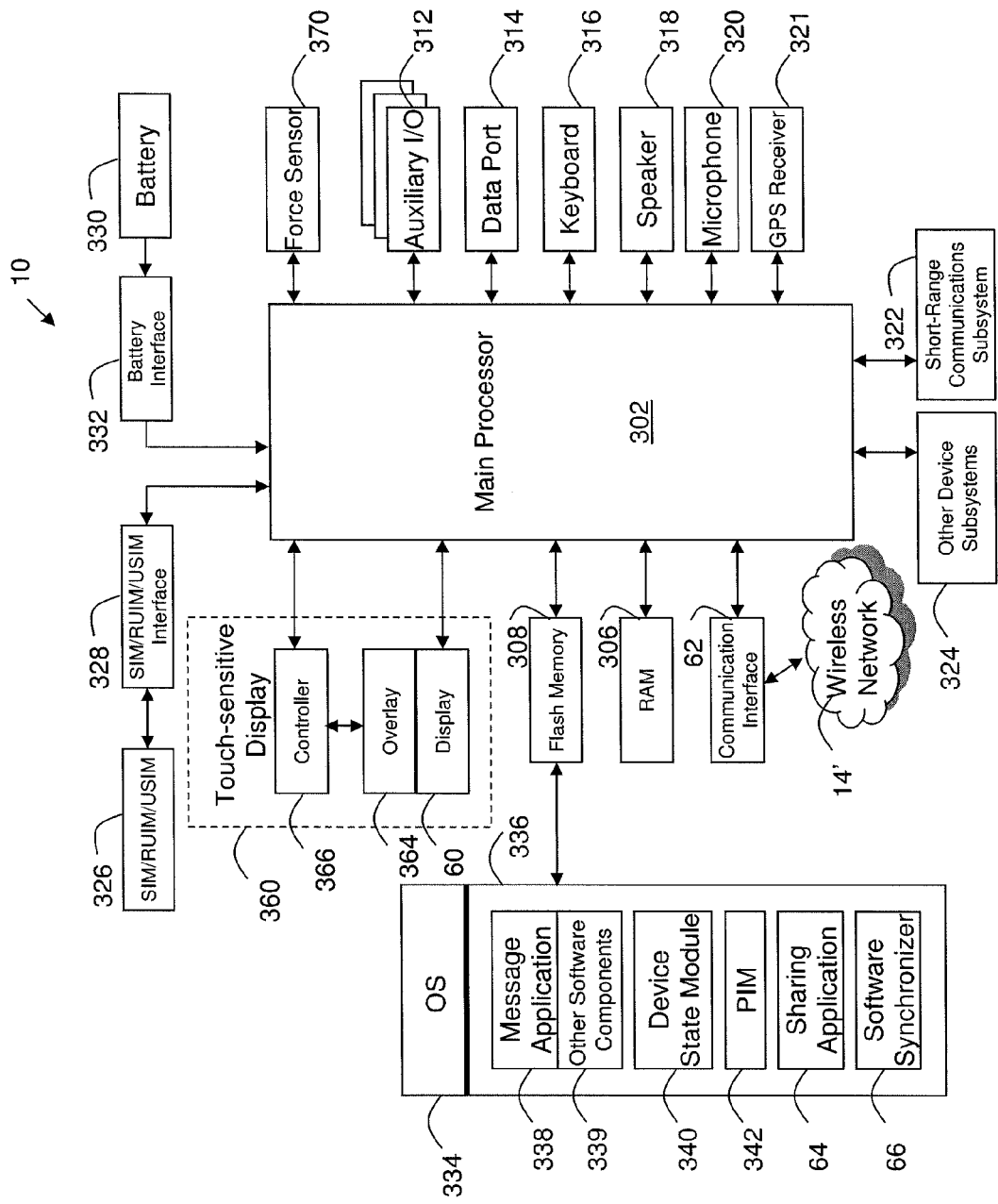
FIG. 12 is a block diagram of an example of a configuration for a mobile electronic device.

Referring to FIG. 12, to further aid in the understanding of the example first and second devices 10, 12 described above, shown therein is a block diagram of an example configuration of the first device 10 configured as a "mobile device". The mobile device 10 includes a number of components such as a main processor 302 that controls the overall operation of the mobile device 10. Communication functions, including data and voice communications, are performed through a communication interface 62. The communication interface 62 receives messages from and sends messages to a wireless network 14'. In this example of the mobile device 10, the communication interface 62 is configured in accordance with the Global System for Mobile Communication (GSM) and General Packet Radio Services (GPRS) standards, which is used worldwide. Other communication configurations that are equally applicable are the 3 G and 4 G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behavior described herein, and it will also be understood by persons skilled in the art that the examples described herein are intended to use any other suitable standards that are developed in the future. The wireless link connecting the communication interface 62 with the wireless network 14' represents one or more different Radio Frequency (RF) channels, operating according to defined protocols specified for GSM/GPRS communications.

The main processor 302 also interacts with additional subsystems such as a Random Access Memory (RAM) 306, a flash memory 308, a touch-sensitive display 360, an auxiliary input/output (I/O) subsystem 312, a data port 314, a keyboard 316 (physical, virtual, or both), a speaker 318, a microphone 320, a GPS receiver 321, short-range communications subsystem 322, and other device subsystems 324. Some of the subsystems of the mobile device 10 perform communication-related functions, whereas other subsystems may provide "resident" or on-device functions. By way of example, the touch-sensitive display 360 and the keyboard 316 may be used for both communication-related functions, such as entering a text message for transmission over the wireless network 14', and device-resident functions such as a calculator or task list. In one example, the mobile device 10 can include a non touch-sensitive display in place of, or in addition to the touch-sensitive display 360. For example the touch-sensitive display 360 can be replaced by a display 60 that may not have touch-sensitive capabilities.

The mobile device 10 can send and receive communication signals over the wireless network 14' after required network registration or activation procedures have been completed. Network access is associated with a subscriber or user of the mobile device 10. To identify a subscriber, the mobile device 10 may use a subscriber module component or "smart card" 326, such as a Subscriber Identity Module (SIM), a Removable User Identity Module (RUIM) and a Universal Subscriber Identity Module (USIM). In the example shown, a SIM/RUIM/USIM 326 is to be inserted into a SIM/RUIM/USIM interface 328 in order to communicate with a network.

The mobile device 10 is typically a battery-powered device and includes a battery interface 332 for receiving one or more rechargeable batteries 330. In at least some examples, the battery 330 can be a smart battery with an embedded microprocessor. The battery interface 332 is coupled to a regulator (not shown), which assists the battery 330 in providing power to the mobile device 10. Although current technology makes use of a battery, future technologies such as micro fuel cells may provide the power to the mobile device 10.

The mobile device 10 also includes an operating system 334 and software components 336 to 342, 64, and 66. The operating system 334 and the software components 336 to 342, 64, and 66, that are executed by the main processor 302 are typically stored in a persistent store such as the flash memory 308, which may alternatively be a read-only memory (ROM) or similar storage element (not shown). Those skilled in the art will appreciate that portions of the operating system 334 and the software components 336 to 342, 64, and 66, such as specific device applications, or parts thereof, may be temporarily loaded into a volatile store such as the RAM 306. Other software components can also be included, as is well known to those skilled in the art.

The subset of software applications 336 that control basic device operations, including data and voice communication applications, may be installed on the mobile device 10 during its manufacture. Software applications may include a message application 338, a device state module 340, a Personal Information Manager (PIM) 342, a sharing application 64, and a software synchronizer 66. A message application 338 can be any suitable software program that allows a user of the mobile device 10 to send and receive electronic messages, wherein messages are typically stored in the flash memory 308 of the mobile device 10. A device state module 340 provides persistence, i.e. the device state module 340 ensures that important device data is stored in persistent memory, such as the flash memory 308, so that the data is not lost when the mobile device 10 is turned off or loses power. A PIM 342 includes functionality for organizing and managing data items of interest to the user, such as, but not limited to, e-mail, contacts, calendar events, and voice mails, and may interact with the wireless network 14'.

Other types of software applications or components 339 can also be installed on the mobile device 10. These software applications 339 can be pre-installed applications (i.e. other than message application 338) or third party applications, which are added after the manufacture of the mobile device 10. Examples of third party applications include games, calculators, utilities, etc.

The additional applications 339 can be loaded onto the mobile device 10 through at least one of the wireless network 14', the auxiliary I/O subsystem 312, the data port 314, the short-range communications subsystem 30, or any other suitable device subsystem 324.

The data port 314 can be any suitable port that enables data communication between the mobile device 10 and another computing device. The data port 314 can be a serial or a parallel port. In some instances, the data port 314 can be a universal serial bus (USB) port that includes data lines for data transfer and a supply line that can provide a charging current to charge the battery 330 of the mobile device 10.

For voice communications, received signals are output to the speaker 318, and signals for transmission are generated by the microphone 320. Although voice or audio signal output is accomplished primarily through the speaker 318, the display 60 can also be used to provide additional information such as the identity of a calling party, duration of a voice call, or other voice call related information.

The touch-sensitive display 360 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In the presently described example, the touch-sensitive display 360 is a capacitive touch-sensitive display which includes a capacitive touch-sensitive overlay 364. The overlay 364 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide. (ITO).

The display 60 of the touch-sensitive display 360 may include a display area in which information may be displayed, and a non-display area extending around the periphery of the display area. Information is not displayed in the non-display area, which is utilized to accommodate, for example, one or more of electronic traces or electrical connections, adhesives or other sealants, and protective coatings, around the edges of the display area.

One or more touches, also known as touch contacts or touch events, may be detected by the touch-sensitive display 360. The processor 302 may determine attributes of the touch, including a location of a touch. Touch location data may include an area of contact or a single point of contact, such as a point at or near a center of the area of contact, known as the centroid. A signal is provided to the controller 366 in response to detection of a touch. A touch may be detected from any suitable object, such as a finger, thumb, appendage, or other items, for example, a stylus, pen, or other pointer, depending on the nature of the touch-sensitive display 360. The location of the touch moves as the detected object moves during a touch. One or both of the controller 366 and the processor 302 may detect a touch by any suitable contact member on the touch-sensitive display 360. Similarly, multiple simultaneous touches, are detected.

One or more gestures are also detected by the touch-sensitive display 360. A gesture is a particular type of touch on a touch-sensitive display 360 that begins at an origin point and continues to an end point. A gesture may be identified by attributes of the gesture, including the origin point, the end point, the distance travelled, the duration, the velocity, and the direction, for example. A gesture may be long or short in distance and long or short in duration. Two points of the gesture may be utilized to determine a direction of the gesture.

An example of a gesture is a swipe (also known as a "flick"). A swipe has a single direction. The touch-sensitive overlay 364 may evaluate swipes with respect to the origin point at which contact is initially made with the touch-sensitive overlay 364 and the end point at which contact with the touch-sensitive overlay 364 ends rather than using each of location or point of contact over the duration of the gesture to resolve a direction.

Examples of swipes include a horizontal swipe, a vertical swipe, and a diagonal swipe. A horizontal swipe typically comprises an origin point towards the left or right side of the touch-sensitive overlay 364 to initialize the gesture, a horizontal movement of the detected object from the origin point to an end point towards the right or left side of the touch-sensitive overlay 364 while maintaining continuous contact with the touch-sensitive overlay 364, and a breaking of contact with the touch-sensitive overlay 364. Similarly, a vertical swipe typically comprises an origin point towards the top or bottom of the touch-sensitive overlay 364 to initialize the gesture, a horizontal movement of the detected object from the origin point to an end point towards the bottom or top of the touch-sensitive overlay 364 while maintaining continuous contact with the touch-sensitive overlay 364, and a breaking of contact with the touch-sensitive overlay 364.

Swipes can be of various lengths, can be initiated in various places on the touch-sensitive overlay 364, and need not span the full dimension of the touch-sensitive overlay 364. In addition, breaking contact of a swipe can be gradual in that contact with the touch-sensitive overlay 364 is gradually reduced while the swipe is still underway.

Meta-navigation gestures may also be detected by the touch-sensitive overlay 364. A meta-navigation gesture is a gesture that has an origin point that is outside the display area of the touch-sensitive overlay 364 and that moves to a position on the display area of the touch-sensitive display. Other attributes of the gesture may be detected and be utilized to detect the meta-navigation gesture. Meta-navigation gestures may also include multi-touch gestures in which gestures are simultaneous or overlap in time and at least one of the touches has an origin point that is outside the display area and moves to a position on the display area of the touch-sensitive overlay 364. Thus, two fingers may be utilized for meta-navigation gestures. Further, multi-touch meta-navigation gestures may be distinguished from single touch meta-navigation gestures and may provide additional or further functionality.

In some examples, an optional force sensor 370 or force sensors is disposed in any suitable location, for example, between the touch-sensitive display 360 and a back of the mobile device 10 to detect a force imparted by a touch on the touch-sensitive display 360. The force sensor 370 may be a force-sensitive resistor, strain gauge, piezoelectric or piezoresistive device, pressure sensor, or other suitable device. Force as utilized throughout the specification refers to one or more of force measurements, estimates, and calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

It will be appreciated that any module or component exemplified herein that executes instructions may include or otherwise have access to computer readable media such as storage media, computer storage media, or data storage devices (removable or non-removable or both removable and non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the first device 10 or second device 12, or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of operating a first electronic device for sharing items with a second electronic device, the method comprising:

the first electronic device identifying a first data item to be shared with the second electronic device;

the first electronic device obtaining peer data from a third party system, the peer data including information indicative of software capabilities of the second electronic device for outputting at least one type of data item using the second electronic device, the third party system being associated with both the first and second electronic devices;

the first electronic device determining, from the information in the peer data and after identifying the first data item, that the second electronic device does not have a software capability necessary for the first electronic device to output the first data item to the second electronic device and for processing by the second electronic device;

the first electronic device storing a transaction identifier associated with the first data item, and using the transaction identifier to determine that the first data item is to be sent to the second electronic device after the software capability to output the first data item has been acquired;

the first electronic device providing, after the determining, information to the second electronic device for obtaining the software capability for processing the first data item; and after providing the information to the second electronic device, the first electronic device sending the first data item to the second electronic device after determining that the software capability to output the first data item has been acquired by the second electronic device.

2. The method of claim 1, the first device caching the first data item until the second electronic device obtains the software capability to output the first data item.

3. The method of claim 1, further comprising receiving confirmation from the second electronic device that the software capability to output the first data item has been acquired prior to sending the first data item.

4. The method of claim 1, further comprising requesting the peer data from the third party system.

5. The method of claim 1, the peer data being sent to the first electronic device by the third party system.

6. The method of claim 1, the third party system comprising an instant messaging system operable to obtain and provide the peer data indicative of software capabilities to of the second electronic device for outputting data items.

7. The method of claim 1, further comprising:
determining from the peer data that the second electronic device has the software capabilities necessary to output a second data item to be shared with the second electronic device; and
sending the second data item to the second electronic device.

8. The method of claim 1, the first data item being shared over a peer-to-peer communication system.

9. The method of claim 1, the first data item being shared over a short-range communication connection.

10. The method of claim 1, further comprising determining, from the peer data, that the second electronic device does not have a software capability necessary to output a third data item, and providing additional information to the second electronic device for obtaining the software capability necessary for outputting the third data item.

11. A non-transitory computer readable storage medium comprising computer executable instructions for operating a first electronic device for sharing items with a second electronic device, the computer executable instructions comprising instructions for:
the first electronic device identifying a first data item to be shared with the second electronic device;
the first electronic device obtaining peer data from a third party system, the peer data including information indicative of software capabilities of the second electronic device for outputting at least one type of data item using the second electronic device, the third party system being associated with both the first and second electronic devices;
the first electronic device determining, from the information in the peer data and after identifying the first data item, that the second electronic device does not have a software capability necessary for the first electronic device to output the first data item to the second electronic device;
the first electronic device storing a transaction identifier associated with the first data item, and using the transaction identifier to determine that the first data item is to be sent to the second electronic device after the software capability to output the first data item has been acquired;

the first electronic device providing, after the determining, information to the second electronic device for obtaining the software capability for processing the first data item; and after providing the information to the second electronic device, the first electronic device sending the first data item to the second electronic device after determining that the software capability to output the first data item has been acquired by the second electronic device.

12. A first electronic device comprising a processor and memory, the memory comprising computer executable instructions for operating the processor to:
the first electronic device identifying a first data item to be shared with the second electronic device;
the first electronic device obtaining peer data from a third party system, the peer data including information indicative of software capabilities of the second electronic device for outputting at least one type of data item using the second electronic device, the third party system being associated with both the first and second electronic devices;
the first electronic device determining, from the information in the peer data and after identifying the first data item, that the second electronic device does not have a software capability for the first electronic device to output the first data item to the second electronic device;
the first electronic device providing, after the determining, information to the second electronic device for obtaining the software capability for processing the first data item; and
after providing the information to the second electronic device, the first electronic device sending the first data item to the second electronic device after determining that the software capability to output the first data item has been acquired by the second electronic device.

13. The non-transitory computer readable medium of claim 11, the first device caching the first data item until the second electronic device obtains the software capability to output the first data item.

14. The non-transitory computer readable medium of claim 11, further comprising instructions for receiving confirmation from the second electronic device that the software capability to output the first data item has been acquired prior to sending the first data item.

15. The non-transitory computer readable medium of claim 11, the third party system comprising an instant messaging system operable to obtain and provide the peer data indicative of software capabilities to of the second electronic device for outputting data items.

16. The non-transitory computer readable medium of claim 11, further comprising instructions for:
determining from the peer data that the second electronic device has the software capabilities necessary to output a second data item to be shared with the second electronic device; and
sending the second data item to the second electronic device.

17. The non-transitory computer readable medium of claim 11, further comprising instructions for determining, from the peer data, that the second electronic device does not have a software capability necessary to output a third data item, and providing additional information to the second electronic device for obtaining the software capability necessary for outputting the third data item.

18. The non-transitory computer readable medium of claim 11, further comprising instructions for performing at least one of: requesting the peer data from the third party system, and receiving the peer sent to the first electronic device by the third party system.

* * * * *